(12) United States Patent
Miao et al.

(10) Patent No.: US 11,523,382 B2
(45) Date of Patent: Dec. 6, 2022

(54) RESOURCE DETERMINING METHOD AND APPARATUS, AND RESOURCE INDICATION METHOD AND APPARATUS

(71) Applicant: China Academy of Telecommunications Technology, Beijing (CN)

(72) Inventors: Deshan Miao, Beijing (CN); Ekpenyong Tony, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 74 days.

(21) Appl. No.: 17/042,919

(22) PCT Filed: Mar. 7, 2019

(86) PCT No.: PCT/CN2019/077358
§ 371 (c)(1),
(2) Date: Sep. 29, 2020

(87) PCT Pub. No.: WO2019/192283
PCT Pub. Date: Oct. 10, 2019

(65) Prior Publication Data
US 2021/0022124 A1 Jan. 21, 2021

(30) Foreign Application Priority Data

Apr. 4, 2018 (CN) .......................... 201810300361.6

(51) Int. Cl.
*H04W 4/00* (2018.01)
*H04W 72/04* (2009.01)

(52) U.S. Cl.
CPC ..... *H04W 72/042* (2013.01); *H04W 72/0413* (2013.01)

(58) Field of Classification Search
CPC H04W 72/04; H04W 72/0413; H04L 5/0053; H04L 5/0055; H04L 1/1861
See application file for complete search history.

(56) References Cited

U.S. PATENT DOCUMENTS

2015/0264678 A1 9/2015 Yin et al.
2016/0050601 A1 2/2016 Jeong et al.
(Continued)

FOREIGN PATENT DOCUMENTS

CN 102281520 A 12/2011
CN 103621168 A 3/2014
(Continued)

OTHER PUBLICATIONS

Samsung,"Resource Allocation for PUCCH transmission", 3GPP TSG RAN WG1 Meeting 90bis, 3GPP TSG RAN WG1 Meeting 90bis, total 4 pages, R1-1717655.
(Continued)

*Primary Examiner* — Bo Hui A Zhu
(74) *Attorney, Agent, or Firm* — Kilpatrick Townsend & Stockton, LLP (57) ABSTRACT

Disclosed are a resource determining method and apparatus, and a resource indication method and apparatus for solving the problem of how the UE determines physical uplink control channel (PUCCH) resources in the radio resource control (RRC) reconfiguration state. The resource determining method comprises: detecting a physical downlink control channel (PDCCH); and determining PUCCH resources required by a user equipment (UE) during RRC reconfiguration by detecting the PDCCH.

14 Claims, 3 Drawing Sheets

(56) References Cited

U.S. PATENT DOCUMENTS

2018/0219606 A1* 8/2018 Ng .............................. H04L 1/06
2019/0223199 A1* 7/2019 Park .................. H04W 72/1289
2019/0393992 A1* 12/2019 Xiong ................... H04L 1/1812

FOREIGN PATENT DOCUMENTS

| CN | 106102169 A | 11/2016 |
| CN | 107659994 A | 2/2018 |
| EP | 2768174 A1 | 8/2014 |
| KR | 20150073467 A | 7/2015 |
| WO | 2016046612 A1 | 3/2016 |
| WO | 2019082157 A1 | 5/2019 |

OTHER PUBLICATIONS

Samsung, "Resource Allocation for PUCCH transmission", 3GPP TSG RAN WG1 Meeting 91, Reno, USA, Nov. 27-Dec. 1, 2017, total 7 pages, R1-1720333.
Intel Corporation, "Resource allocation for PUCCH during initial access", 3GPP TSG RAN WG1 Meeting #90, Prague, P.R. Czechia, Aug. 21-25, 2017, total 4 pages, R1-1712583.

\* cited by examiner

RESOURCE DETERMINING METHOD AND APPARATUS, AND RESOURCE INDICATION METHOD AND APPARATUS

The present application is a National Stage of International Application No. PCT/CN2019/077358, filed Mar. 7, 2019, which claims the priority from Chinese Patent Application No. 201810300361.6, filed with the Chinese Patent Office on Apr. 4, 2018 and entitled "Resource Determining Method and Apparatus, and Resource Indication Method and Apparatus", both of which are hereby incorporated by reference in their entireties.

FIELD OF DISCLOSURE

The present application relates to the field of communication technologies and particularly to a resource determining method and apparatus, and a resource indication method and apparatus.

BACKGROUND

In the 5G New Radio (NR) system, the resource allocation of the Physical Uplink Control Channel (PUCCH) needs to consider the initial access phase and two scenarios after the Radio Resource Control (RRC) connection respectively. However, when a User Equipment (UE) is in the RRC reconfiguration state, the network side and the user equipment have inconsistent understanding of PUCCH resources, so the UE does not determine which resource to be used for uplink data transmission.

BRIEF SUMMARY

The embodiments of the present application provide a resource determining method and apparatus, and a resource indication method and apparatus, to solve the problem of how the UE determines the PUCCH resources in the RRC reconfiguration state.

An embodiment of the present application provides a resource determining method, which includes:
  detecting a Physical Downlink Control Channel, PDCCH;
  determining PUCCH resources required by a UE during RRC reconfiguration based on detected PDCCH.

When the UE is in the RRC reconfiguration state, the PUCCH resources required by the UE during the RRC reconfiguration are determined based on detected PDCCH. Therefore, during the RRC reconfiguration, the UE determines, according to the PDCCH detected by itself, the PUCCH resources that need to be used in the corresponding RRC reconfiguration case, avoiding the confusion phenomenon that the UE cannot determine which resource indication method is use for determining the PUCCH resources when the UE is in the reconfiguration state.

In one embodiment, in the above resource determining method provided by some embodiments of the present application, the PDCCH is detected in a Control Resource Set, CORESET, indicated by a network side.

In one embodiment, the UE determines the PUCCH resources that need to be used in the corresponding RRC reconfiguration case by detecting the PDCCH in the CORESET, simplifying the manner of determining the PUCCH resources.

In one embodiment, in the above resource determining method provided by some embodiments of the present application, the PDCCH is detected in CORESET 0.

In one embodiment, the CORESET 0 is a control resource set configured by the network side when the UE initially accesses it, and is usually used to schedule the resource set used by the PDCCH when the system information or a dedicated information is sent. Therefore, the UE can determine the PUCCH resources that need to be used in the corresponding RRC reconfiguration case according to the PDCCH detected in the CORESET 0, simplifying the manner of determining the PUCCH resources.

In one embodiment, in the above resource determining method provided by some embodiments of the present application, determining PUCCH resources required by a UE during RRC reconfiguration based on detected PDCCH, includes:
  determining the PUCCH resources from a cell specific PUCCH resource set in response to that detecting one PDCCH or two PDCCHs in the CORESET 0 and bits occupied by Hybrid Automatic Repeat Request, HARQ, feedback information is less than or equal to 2;
  determining the PUCCH resources from a dedicated PUCCH resource set of the UE in response to that detecting a PDCCH that does not belong to the CORESET 0;
  determining the PUCCH resources from the dedicated PUCCH resource set of the UE in response to that detecting a plurality of PDCCHs and bits occupied by the HARQ feedback information is greater than 2.

In one embodiment, the UE determines the PUCCH resources in different ways by detecting the PDCCH in the CORESET 0 and according to the number of PDCCHs in the CORESET 0 and the number of bits occupied by the HARQ feedback information, increasing the flexibility of determining the PUCCH resources by the UE.

In one embodiment, in the above resource determining method provided by some embodiments of the present application, the determining the PUCCH resources includes:
in response to that a format of the detected PDCCH is Downlink Control Information, DCI 1_0 or the DCI information carried in the detected PDCCH contains the 4-bit information indicating a PUCCH resource index, determining the PUCCH resources from a cell specific PUCCH resource set.

In the above way, the ways in which the UE determines the PUCCH resources are further increased, and the flexibility of the PUCCH resource determining method is improved.

In one embodiment, in the above resource determining method provided by some embodiments of the present application, the cell specific PUCCH resource set is a cell specific PUCCH resource set configured by the UE during the initial access.

Correspondingly, an embodiment of the present application further provides a resource indication method, which includes:
  determining that a UE is in an RRC reconfiguration state;
  sending a PDCCH to the UE to indicate PUCCH resources required by the UE during RRC reconfiguration.

After determining that the UE is in the RRC reconfiguration state, the network side sends the PDCCH to the UE to indicate the PUCCH resources required by the UE during the RRC reconfiguration, so that the UE determines, according to the PDCCH detected by itself, the PUCCH resources that need to be used in the corresponding RRC reconfiguration case when the UE is in the RRC reconfiguration state.

In one embodiment, in the above resource indication method provided by some embodiments of the present application, sending a PDCCH to the UE, includes:
  sending the PDCCH in a CORESET configured by a network side for the UE.

In one embodiment, in the above resource indication method provided by some embodiments of the present application, sending a PDCCH to the UE to indicate PUCCH resources required by the UE during RRC reconfiguration, includes:
  notifying the UE of determining the PUCCH resources in a cell specific PUCCH resource set through an index of the CORESET, or a PDCCH format, or a DCI information indication field carried in the PDCCH.

In the above way, the ways in which the UE determines the PUCCH resources are further increased, and the flexibility of the PUCCH resource determining method is improved.

Correspondingly, on the terminal side, an embodiment of the present application further provides a resource determining apparatus, which includes:
  a memory configured to store program instructions;
  a processor configured to invoke the program instructions stored in the memory to perform a process of:
    detecting a PDCCH;
    determining PUCCH resources required by a UE during RRC reconfiguration based on detected PDCCH.

In one embodiment, in the above resource determining apparatus provided by some embodiments of the present application, the processor is further configured to detect the PDCCH in a CORESET indicated by a network side.

In one embodiment, in the above resource determining apparatus provided by some embodiments of the present application, the processor is further configured to detect the PDCCH in CORESET 0.

In one embodiment, in the above resource determining apparatus provided by some embodiments of the present application, the processor is configured to invoke the program instructions to determine the PUCCH resources by:
  determining the PUCCH resources from a cell specific PUCCH resource set in response to that detecting one PDCCH or two PDCCHs in the CORESET 0 and bits occupied by HARQ feedback information is less than or equal to 2;
  determining the PUCCH resources from a dedicated PUCCH resource set of the UE in response to that detecting a PDCCH that does not belong to the CORESET 0;
  determining the PUCCH resources from the dedicated PUCCH resource set of the UE in response to that detecting a plurality of PDCCHs and bits occupied by the HARQ feedback information is greater than 2.

In one embodiment, in the above resource determining apparatus provided by some embodiments of the present application, the processor is configured to invoke the program instructions to determine the PUCCH resources by: in response to that a format of the detected PDCCH is DCI 1_0 or the DCI information carried in the detected PDCCH contains the 4-bit information indicating a PUCCH resource index, determining the PUCCH resources from a cell specific PUCCH resource set.

In one embodiment, in the above resource determining apparatus provided by some embodiments of the present application, the cell specific PUCCH resource set is a cell specific PUCCH resource set configured by the UE during the initial access.

Correspondingly, on the base station side, an embodiment of the present application further provides a resource indication apparatus, which includes:
  a memory configured to store program instructions;
  a processor configured to invoke the program instructions stored in the memory to perform a process of:
    determining that a UE is in an RRC reconfiguration state;
    sending a PDCCH to the UE via a transceiver to indicate PUCCH resources required by the UE during RRC reconfiguration.

In one embodiment, in the above resource indication apparatus provided by some embodiments of the present application, the processor is configured to invoke the program instructions to send the PDCCH by:
  sending the PDCCH in a CORESET configured by a network side for the UE.

In one embodiment, in the above resource indication apparatus provided by some embodiments of the present application, the processor is configured to invoke the program instructions to send the PDCCH by:
  notifying the UE of determining the PUCCH resources in a cell specific PUCCH resource set through an index of the CORESET, or a PDCCH format, or a DCI information indication field carried in the PDCCH.

Correspondingly, on the terminal side, an embodiment of the present application provides a second resource determining apparatus, which includes:
  a detection device configured to detect a PDCCH;
  a determining device configured to determine PUCCH resources required by a UE during RRC reconfiguration based on detected PDCCH.

Correspondingly, on the base station side, an embodiment of the present application provides a second resource indication apparatus, which includes:
  a determining device configured to determine that a UE is in an RRC reconfiguration state;
  a sending device configured to send a PDCCH to the UE to indicate PUCCH resources required by the UE during RRC reconfiguration.

Correspondingly, an embodiment of the present application further provides a computer storage medium storing the computer executable instructions which are configured to cause the computer to perform any method described above.

BRIEF DESCRIPTION OF THE DRAWINGS

In order to illustrate the embodiments of the present application more clearly, the accompanying figures which need to be used in describing the embodiments will be introduced below briefly.

DETAILED DESCRIPTION OF THE EMBODIMENTS

Embodiments of the disclosure will be described clearly and completely below in combination with the accompanying drawings in the embodiments of the disclosure.

Embodiments of the disclosure can be applied to various communication systems, for example, Global System of Mobile communication (GSM) system, Code Division Multiple Access (CDMA) system, Wideband Code Division Multiple Access (WCDMA) system, General Packet Radio Service (GPRS), Long Term Evolution (LTE) system, Advanced long term evolution (LTE-A) system, Universal Mobile Telecommunication System (UMTS), New Radio (NR) and the like.

In the 5G NR system, in the initial access phase of the UE, a plurality of user equipments share one PUCCH resource set that may include a plurality of PUCCH resources. For example, one PUCCH resource set may include 16 PUCCH resources. When receiving the Remaining Minimum System Information (RMSI) indication information, the UE acquires a PUCCH resource set through the RMSI indication information, and determines the PUCCH resource index according to the Downlink Control Information (DCI) indication information or in combination with the implicit indication information, to obtain a PUCCH resource in the PUCCH resource set, so that the UE uses this method to obtain the PUCCH resources and performs the PUCCH transmission when performing the Hybrid Automatic Repeat Request (HARQ)-bearer acknowledgement (ACK) feedback during the initial access. Here, when the PUCCH resource index is determined according to the implicit indication information, for example, a specific PUCCH resource is mapped onto the index number (index) of the minimum Control Channel Element (CCE) corresponding to the PDCCH. When the PUCCH resource index is determined according to the DCI indication information, for example, the UE is notified of a specific PUCCH resource index according to the DCI information indication field.

After the UE has accessed the system, the UE needs to obtain the PUCCH resource set configured by the RRC, and the PUCCH resource set configured by the RRC includes one PUCCH resource set or multiple PUCCH resource sets, and each resource set includes at most 32 resources; then the UE selects one from multiple PUCCH resource sets to perform the HARQ-ACK feedback according to the number of bits of the HARQ-ACK feedback information, and at the same time, the UE determines the PUCCH resource index according to the DCI indication information or in combination with the implicit indication information.

After the UE has accessed the system, if the UE does not receive the PUCCH set information configured by the RRC, it will continue using the PUCCH resources configured during the initial access of the UE during the HARQ-ACK feedback; if the UE has already obtained the PUCCH resource set configured by the RRC, the UE will be in an unstable state when some wireless transmission parameters carried in the RRC reconfiguration information need to be changed. Since the RRC reconfiguration parameters may change the PUCCH resources during the RRC configuration and the UE has not completed the reception of the RRC reconfiguration, the UE cannot clearly determine which PUCCH resource indication method is used to determine the PUCCH resources at this time, so that the UE is in a confusion state.

Some embodiments of the present application provide a resource determining method and apparatus, and a resource indication method and apparatus, to solve the problem of how the UE determines the PUCCH resources in the RRC reconfiguration state.

The resource determining method and the resource indication method provided in the embodiments of the present application are mainly used when the UE is in the RRC reconfiguration state and before the RRC reconfiguration is completed. After receiving the PDCCH message used to indicate the PUCCH resources required by the UE during the RRC reconfiguration, the PUCCH resources used by the UE are further determined according to the detected PDCCH. Alternatively, the UE determines the PUCCH resources used by the UE and the PUCCH resource index according to the DCI indication information or in combination with the implicit indication information.

The resource determining method and the resource indication method provided by some embodiments of the present application will be introduced below in detail.

Figure 1:
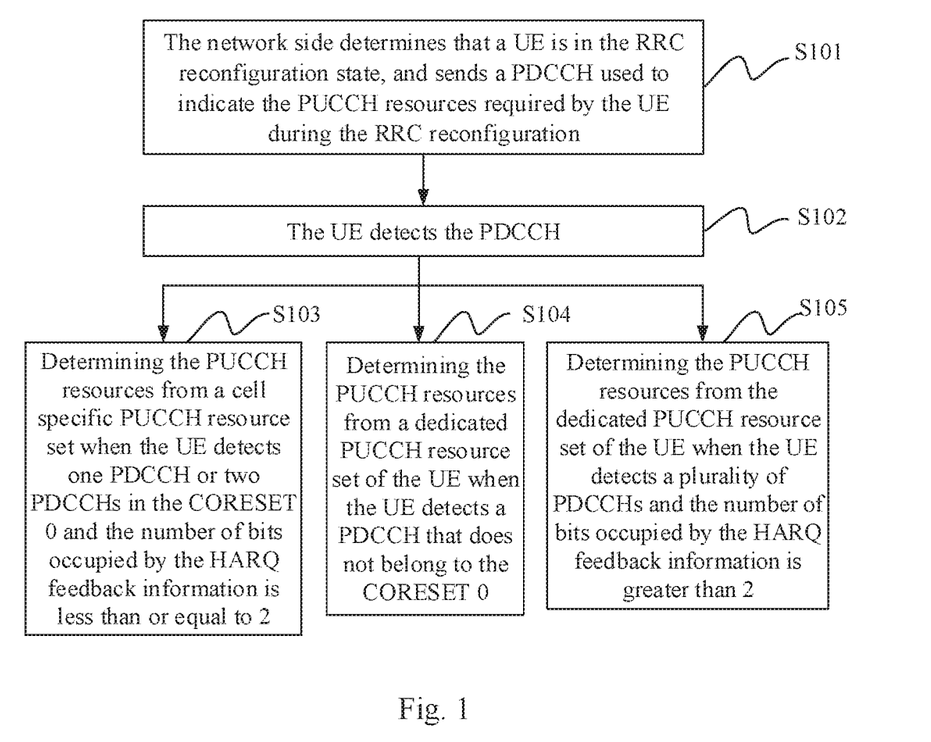
FIG. 1 is a flow schematic diagram of a resource determining and resource indication method provided by an embodiment of the present application.

Referring to FIG. 1, the resource determining and indication method provided by an embodiment of the present application includes the following steps.

S101: the network side determines that a UE is in the RRC reconfiguration state, and sends a PDCCH used to indicate the PUCCH resources required by the UE during the RRC reconfiguration.

In one embodiment, when sending the PDCCH, the network side may send the PDCCH to schedule a Physical Downlink Shared Channel (PDSCH) through any one or more sets in the Control Resource Set (CORESET), and the CORESET is a downlink control resource set configured by the network side for the UE, and there are usually one or more CORESETs.

On the terminal side, the UE may usually detects the PDCCH in one or more CORESETs according to the CORESETs configured by the network side.

S102: the UE detects the PDCCH.

It should be noted that before the UE detects the PDCCH, the UE has received the PUCCH resources configured in the initial access phase, and the PUCCH resources may be a cell specific PUCCH resource set, for example, resource set 0. After the UE establishes an RRC connection, the UE receives one or more PUCCH resources configured by the RRC.

In one embodiment, when the UE detects the PDCCH, including the UE detects the PDCCH in the CORESET, and may detect the PDCCHs in one CORESET or detect the PDCCHs in multiple CORESETs.

In one embodiment, there are multiple CORESETs, so the PDCCHs in the multiple CORESETs are detected when the PDCCH in the CORESET is detected, and the CORESETs include CORESET 0, so the UE detects the PDCCH in the CORESET, including: detecting the PDCCH in the CORESET 0. The CORESET 0 is a control resource set configured by the network side when the UE initially accesses, and is usually used to schedule the resource set used by the PDCCH when the system information or a dedicated information is sent.

In some embodiments of the present application, the resource set needs to be determined firstly for the resource index of the PUCCH, and then the final resource index is formed from the PUCCH resource indication field of the DCI or in combination with the implicit information indication.

In one embodiment, when one PDCCH is detected in the CORESET 0 and the number of bits occupied when the HARQ feedback information is required is less than or equal to 2, the PUCCH resources are determined from the cell specific PUCCH resource set; when two PDCCHs are detected in the CORESET 0 and each PDCCH only indicates the single codeword transmission so that the number of bits occupied by the two PDCCHs when transmitting the HARQ feedback information is at most 2, the PUCCH resources are also determined from the cell specific PUCCH resource set.

Here, when the PUCCH resources are determined from the cell specific PUCCH resource set, the PUCCH resource index may be determined by way of the resource index indicated by the UE in the initial access phase. For example, the PUCCH resource index is determined according to the DCI indication information or in combination with the implicit indication information.

S104: determining the PUCCH resources from a dedicated PUCCH resource set of the UE when the UE detects a PDCCH that does not belong to the CORESET 0.

In one embodiment, when the UE cannot detect any PDCCH in the CORESET, the UE performs the PUCCH transmission according to the dedicated PUCCH resource set of the UE determined in the RRC configuration signaling; or when the UE detects a PDCCH but this PDCCH does not belong to the PDCCHs of the CORESET 0, the UE performs the PUCCH transmission according to the dedicated PUCCH resource set of the UE determined in the RRC configuration signaling.

Here, the dedicated resource set of the UE is a resource set used by the UE to perform the PUCCH transmission and determined by the UE according to the RRC configuration information after the RRC connection. Then, the resource index of the dedicated resource set of the UE is determined according to the DCI indication information.

S105: determining the PUCCH resources from the dedicated PUCCH resource set of the UE when the UE detects a plurality of PDCCHs and the number of bits occupied by the HARQ feedback information is greater than 2.

It should be noted that the HARQ feedback information includes an HARQ-ACK message and an HARQ-NACK message.

In one embodiment, the UE detects a plurality of PDCCHs in many cases. For example, the UE detects a plurality of PDCCHs in the CORESET 0, and the number of bits occupied by the HARQ feedback information corresponding to the plurality of PDCCHs is greater than 2; or the UE detects one PDCCH in the CORESET 0 and detects a plurality of PDCCHs in other CORESETs than the CORESET 0, and the number of bits occupied by the HARQ feedback information corresponding to the plurality of PDCCHs is greater than 2; or the UE detects a plurality of PDCCHs in other CORESETs than the CORESET 0, and the number of bits occupied by the HARQ feedback information corresponding to the plurality of PDCCHs is greater than 2, and the plurality PDCCHs include two or more PDCCHs, which is not specifically limited here.

Here, the dedicated PUCCH resource set of the UE is a resource set used by the UE to perform the PUCCH transmission and determined by the UE according to the RRC configuration information after the RRC connection. Then, the resource index of the dedicated resource set of the UE is determined according to the DCI indication information.

In the solution provided by some embodiments of the present application, the DCI indication information includes the DCI information indication field or DCI format information. Multiple methods can be used when the UE determines the PUCCH resource index in the resource set. For example, the DCI format information or the DCI information indication field may be used to determine the PUCCH resource index in the PUCCH resource set. The downlink DCI format 1_0 is a DCI type used for fallback, that is, it can be used to send the PDCCH during the UE initial access or system information configuration. The judgment basis of the PUCCH resources during the RRC reconfiguration may be used. In one embodiment, when the UE detects that the format of the PDCCH sent by the network is DCI format 1_0, the UE will select the cell specific PUCCH resource set to send the PUCCH resources. In addition, the information indication field of the DCI may also be used to determine the PUCCH resource set. In one embodiment, the current PUCCH resource set configured during the initial access contains 16 resources, which need to be indicated by the 4-bit resource indication field. If the information indication field of the DCI contains 4-bit PUCCH resource indication information, the UE considers that the currently used PUCCH set is the cell specific PUCCH resource set.

In the technical solution provided by some embodiments of the present application, the resource set needs to be determined firstly for the resource index of the PUCCH, and then the final resource index is formed from the PUCCH resource indication field of the DCI or in combination with the implicit information indication.

Figure 2:
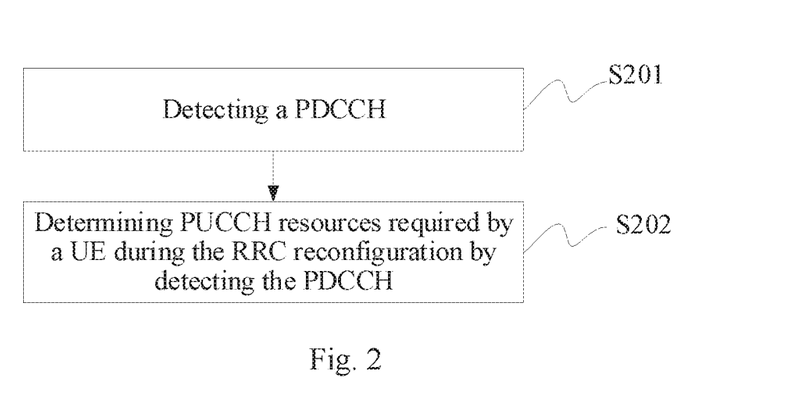
FIG. 2 is a flow schematic diagram of a resource determining method provided by an embodiment of the present application.

In summary, on the terminal side, referring to FIG. 2, a resource determining method provided by an embodiment of the present application includes:

S201: detecting a PDCCH;

S202: determining PUCCH resources required by a UE during the RRC reconfiguration by detecting the PDCCH.

In the present application, when the UE is in the RRC reconfiguration state, the PUCCH resources required by the UE during the RRC reconfiguration are determined by detecting the PDCCH. Therefore, during the RRC reconfiguration, the UE determines, according to the PDCCH detected by itself, the PUCCH resources that need to be used in the corresponding RRC reconfiguration case, avoiding the confusion phenomenon that the UE cannot determine which resource indication method is use for determining the PUCCH resources when the UE is in the reconfiguration state.

In one embodiment, in the above resource determining method provided by some embodiments of the present application, the PDCCH is detected in a CORESET indicated by the network side.

In the present application, the UE can detect the PDCCH in the CORESET, so that the UE further determines the PUCCH resources that need to be used in the corresponding RRC reconfiguration case according to the PDCCH in the CORESET, simplifying the manner of determining the PUCCH resources.

In one embodiment, in the above resource determining method provided by the embodiments of the present application, the PDCCH is detected in CORESET 0.

In the present application, the UE can further determine the PUCCH resources that need to be used in the corresponding RRC reconfiguration case according to the PDCCH detected in the CORESET 0, avoiding the complicated steps of detecting all the PDCCHs in the CORESET to determine the PUCCH resources by the UE, and further simplifying the manner of determining the PUCCH resources.

In one embodiment, in the above resource determining method provided by the embodiments of the present application, determining PUCCH resources required by a UE during the RRC reconfiguration by detecting the PDCCH, includes:

determining the PUCCH resources from a cell specific PUCCH resource set when detecting one PDCCH or two PDCCHs in the CORESET 0 and the number of bits occupied by the HARQ feedback information is less than or equal to 2;

determining the PUCCH resources from a dedicated PUCCH resource set of the UE when detecting a PDCCH that does not belong to the CORESET 0;

determining the PUCCH resources from the dedicated PUCCH resource set of the UE when detecting a plurality of PDCCHs and the number of bits occupied by the HARQ feedback information is greater than 2.

In the present application, the UE determines the PUCCH resources in different ways by detecting the PDCCH in the CORESET 0 and according to the number of PDCCHs in the CORESET 0 and the number of bits occupied by the HARQ feedback information, increasing the flexibility of determining the PUCCH resources by the UE.

In one embodiment, in the above resource determining method provided by some embodiments of the present application, the format of the detected PDCCH is DCI 1_0 or the DCI information carried in the detected PDCCH contains the 4-bit information indicating a PUCCH resource index, and the PUCCH resources are determined from a cell specific PUCCH resource set.

In the above way, the ways in which the UE determines the PUCCH resources are further increased, and the flexibility of the PUCCH resource determining method is improved.

In one embodiment, in the above resource determining method provided by some embodiments of the present application, the cell specific PUCCH resource set is specifically a cell specific PUCCH resource set configured by the UE during the initial access.

Here, the cell specific PUCCH resource set may be a cell specific PUCCH resource set determined by the UE in the initial access phase, and the resource index of the determined cell specific PUCCH resource set.

Figure 3:
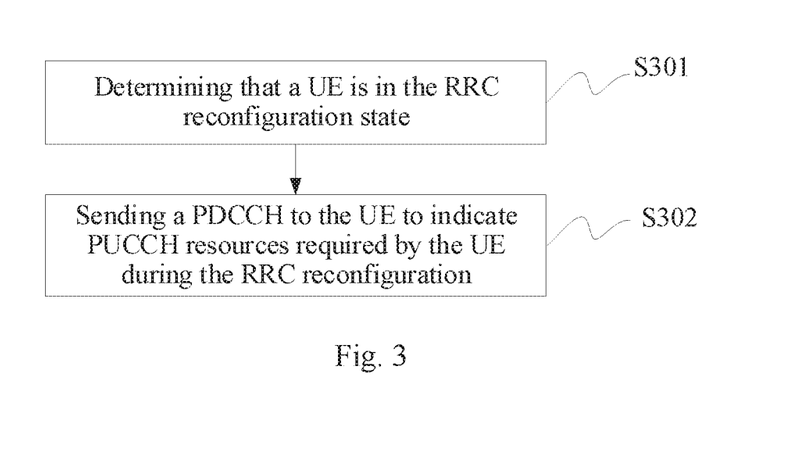
FIG. 3 is a flow schematic diagram of a resource indication method provided by an embodiment of the present application.

Based on the same inventive idea, on the base station side, referring to FIG. 3, an embodiment of the present application further provides a resource indication method, which includes:

S301: determining that a UE is in the RRC reconfiguration state;

S302: sending a PDCCH to the UE to indicate PUCCH resources required by the UE during the RRC reconfiguration.

After determining that the UE is in the RRC reconfiguration state, the network side sends the PDCCH to the UE to indicate the PUCCH resources required by the UE during the RRC reconfiguration, so that the UE determines, according to the PDCCH detected by itself, the PUCCH resources that need to be used in the corresponding RRC reconfiguration case when the UE is in the RRC reconfiguration state.

In one embodiment, in the above resource indication method provided by some embodiments of the present application, sending the PDCCH to the UE includes: sending the PDCCH in the CORESET configured by the network side for the UE.

In one embodiment, the network side may send the PDCCH through one or more CORESETs.

In one embodiment, in the above resource indication method provided by some embodiments of the present application, sending a PDCCH to the UE to indicate PUCCH resources required by the UE during the RRC reconfiguration, includes: notifying the UE of determining the PUCCH resources in a cell specific PUCCH resource set through the index of the CORESET, or the PDCCH format type, or the DCI information indication field carried in the PDCCH.

In the above way, the ways in which the UE determines the PUCCH resources are further increased, and the flexibility of the PUCCH resource determining method is improved.

In the present application, the index of the CORESET specifically refers to which set in the CORESET, for example, the index value of the CORESET is 0, which means CORESET 0. In the present application, the PDCCH format type includes: the format of the PDCCH is the format type of the DCI 1_0, etc. The DCI information indication field carried in the PDCCH includes the 4-bit information indicating the PUCCH resource index contained in the DCI information, and the 4-bit information may be one or more information fields.

In one embodiment, the network side may send one or more PDCCHs through the CORESET 0, or send one or more PDCCHs through other CORESET than the CORESET 0; or the network side sends one or two PDCCHs through the CORESET 0 and sends one or more PDCCHs through other CORESET than the CORESET 0.

Figure 4:
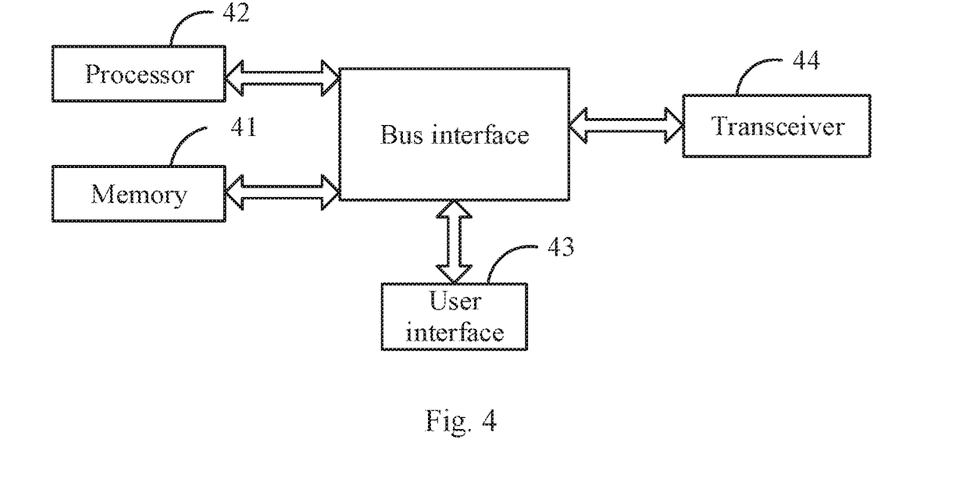
FIG. 4 is a structural schematic diagram of a resource determining apparatus provided by an embodiment of the present application.

On the terminal side, referring to FIG. 4, an embodiment of the present application further provides a resource determining apparatus, which includes:

a memory 41 configured to store program instructions;
  a processor 42 configured to invoke the program instructions stored in the memory 41, and in accordance with the obtained program, perform the process of:
    detecting a PDCCH;
    determining PUCCH resources required by a UE during RRC reconfiguration by detecting the PDCCH.

In one embodiment, in the above resource determining apparatus provided by some embodiments of the present application, the PDCCH is detected in a CORESET indicated by a network side.

In one embodiment, in the above resource determining apparatus provided by some embodiments of the present application, the PDCCH is detected in CORESET 0.

In one embodiment, in the above resource determining apparatus provided by some embodiments of the present application, when determining the PUCCH resources required by the UE during the RRC reconfiguration by detecting the PDCCH, the processor is configured to:

determine the PUCCH resources from a cell specific PUCCH resource set when detecting one PDCCH or two PDCCHs in the CORESET 0 and the number of bits occupied by the HARQ feedback information is less than or equal to 2;
  determine the PUCCH resources from a dedicated PUCCH resource set of the UE when detecting a PDCCH that does not belong to the CORESET 0;
  determine the PUCCH resources from the dedicated PUCCH resource set of the UE when detecting a plurality of PDCCHs and the number of bits occupied by the HARQ feedback information is greater than 2.

In one embodiment, in the above resource determining apparatus provided by some embodiments of the present application, the format of the detected PDCCH is DCI 1_0 or the DCI information carried in the detected PDCCH contains the 4-bit information indicating a PUCCH resource index, and the PUCCH resources are determined from a cell specific PUCCH resource set.

In one embodiment, in the above resource determining apparatus provided by some embodiments of the present application, the cell specific PUCCH resource set is specifically a cell specific PUCCH resource set configured by the UE during the initial access.

Here, in FIG. 4, the bus architecture may include any numbers of interconnected buses and bridges, and specifically link various circuits of one or more processors represented by the processor 42 and the memory represented by the memory 41. The bus architecture may further link various other circuits such as peripheral device, voltage regulator and power management circuit, which are all well known in the art and thus will not be further described again herein. The bus interface provides an interface. The transceiver 44 may be a plurality of elements, i.e., include a transmitter and a receiver, and provide the devices for communicating with various other devices over the transmission media. For different user equipments, the user interface 43 may also be the interface for internally or externally connecting with the required devices, and the connected devices include but not limited to keypad, display, loudspeaker, microphone, joystick and the like.

The processor 42 is responsible for managing the bus architecture and general processing, and the memory 41 may store the data used by the processor 42 when performing the operations.

In one embodiment, the processor 42 may be Central Processing Unit (CPU), Application Specific Integrated Circuit (ASIC), Field-Programmable Gate Array (FPGA) or Complex Programmable Logic Device (CPLD).

Figure 5:
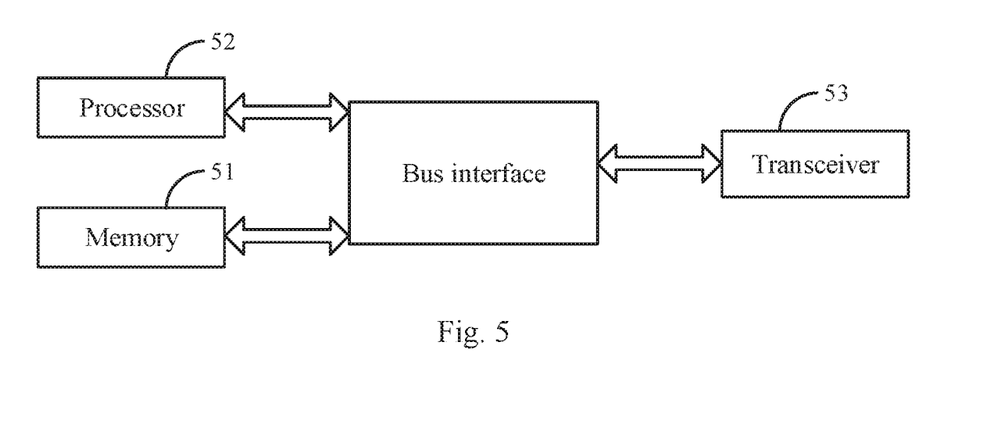
FIG. 5 is a structural schematic diagram of a resource indication apparatus provided by an embodiment of the present application.

Correspondingly, on the base station side, referring to FIG. 5, an embodiment of the present application further provides a resource indication apparatus, which includes:
 a memory 51 configured to store program instructions;
 a processor 52 configured to invoke the program instructions stored in the memory 51, and in accordance with the obtained program, perform the process of:
  determining that a UE is in the RRC reconfiguration state;
  sending a PDCCH to the UE via a transceiver 53 to indicate PUCCH resources required by the UE during the RRC reconfiguration.

In one embodiment, in the above resource indication apparatus provided by some embodiments of the present application, when sending the PDCCH to the UE, the processor 52 is configured to:
 send the PDCCH in a CORESET configured by a network side for the UE.

In one embodiment, in the above resource indication apparatus provided by some embodiments of the present application, when sending the PDCCH to the UE to indicate the PUCCH resources required by the UE during the RRC reconfiguration, the processor is configured to:
 notify the UE of determining the PUCCH resources in a cell specific PUCCH resource set through the index of the CORESET, or the PDCCH format type, or the DCI information indication field carried in the PDCCH.

The transceiver 53 is configured to receive and send the data under the control of the processor 52.

Here, in FIG. 5, the bus architecture may include any numbers of interconnected buses and bridges, and specifically link various circuits of one or more processors represented by the processor 52 and the memory represented by the memory 51. The bus architecture may further link various other circuits such as peripheral device, voltage regulator and power management circuit, which are all well known in the art and thus will not be further described again herein.

The bus interface provides an interface. The transceiver 53 may be a plurality of elements, i.e., include a transmitter and a receiver, and provide the devices for communicating with various other devices over the transmission media. The processor 52 is responsible for managing the bus architecture and general processing, and the memory 51 may store the data used by the processor 52 when performing the operations.

The processor 52 may be Central Processing Unit (CPU), Application Specific Integrated Circuit (ASIC), Field-Programmable Gate Array (FPGA) or Complex Programmable Logic Device (CPLD).

Figure 6:
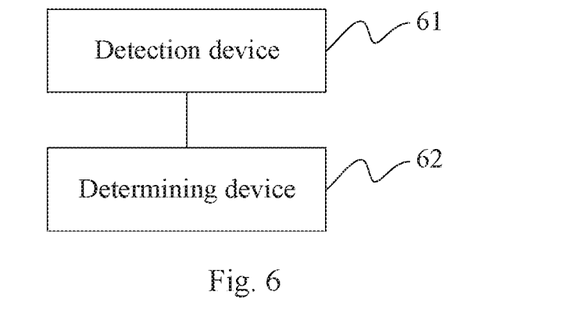
FIG. 6 is a structural schematic diagram of a second resource determining apparatus provided by an embodiment of the present application.

Correspondingly, on the terminal side, referring to FIG. 6, an embodiment of the present application further provides a resource indication apparatus, which includes:
 a detection device 61 configured to detect a PDCCH;
 a determining device 62 configured to determine PUCCH resources required by a UE during the RRC reconfiguration by detecting the PDCCH.

Figure 7:
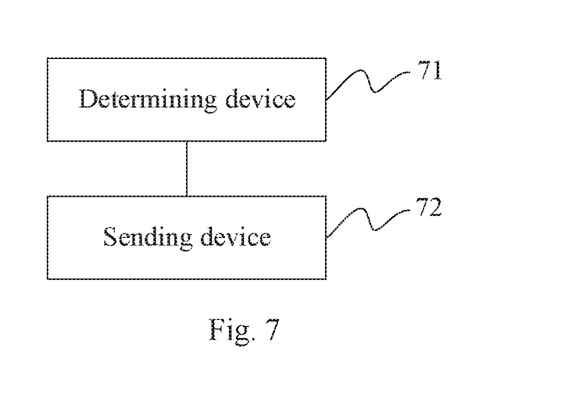
FIG. 7 is a structural schematic diagram of a second resource indication apparatus provided by an embodiment of the present application.

Correspondingly, on the base station side, referring to FIG. 7, an embodiment of the present application provides a second resource indication apparatus, which includes:
 a determining device 71 configured to determine that a UE is in the RRC reconfiguration state;
 a sending device 72 configured to send a PDCCH to the UE to indicate PUCCH resources required by the UE during the RRC reconfiguration.

Correspondingly, an embodiment of the present application further provides a computer storage medium storing the computer executable instructions which are configured to cause the computer to perform any method described above.

The above detection device 61, determining device 62, determining device 71 and sending device 72 may all be realized by physical devices such as processors.

An embodiment of the present application provides a computer storage medium for storing the computer program instructions used by the apparatuses provided by the embodiments of the present application described above, where the computer storage medium contains the program for performing any method (which may be any method on the network side, or may be any method on the terminal side) provided by the embodiments of the present application described above.

The computer storage medium may be any available media or data storage device accessible to the computer, including but not limited to magnetic memory (e.g., floppy disk, hard disk, magnetic tape, Magnetic Optical disc (MO) or the like), optical memory (e.g., CD, DVD, BD, HVD or the like), semiconductor memory (e.g., ROM, EPROM, EEPROM, nonvolatile memory (NAND FLASH), Solid State Disk (SSD)) or the like.

The methods provided by some embodiments of the present application may be applied to the terminal devices, and may also be applied to the network devices.

Here, the terminal device can also referred to as the User Equipment ("UE" for short), Mobile Station ("MS" for short), Mobile Terminal ("MT" for short) or the like. In one embodiment, the terminal can has the ability of communicating with one or more core networks via the Radio Access Network (RAN). For example, the terminal can be a mobile telephone (or called "cellular" telephone), or a computer with the mobile property. For example, the terminal can also be a portable, pocket, handheld, computer built-in or vehicle-carried mobile device.

The network device may be a base station (e.g., access point), which means the device in the access network communicating with the wireless terminal via one or more sectors over the air interface. The base station may be used to perform the inter-conversion between the received air frame and the IP packet, and used as the router between the wireless terminal and the rest of the access network, and the rest of the access network may include Internet Protocol (IP) networks. The base station may further coordinate the attribute management of the air interface. For example, the base station can be the BTS in the GSM or CDMA, or can be the NodeB in the WCDMA, or can be the NodeB or eNB or e-NodeB (evolutional Node B) in the LTE, or can be the gNB in the 5G system, or the like. This aspect is not limited in the embodiments.

In summary, in the present application, it is determined, according to the number of PDCCHs detected by the UE in the CORESET 0, the number of PDCCHs detected in the CORESET and the number of bits occupied by the HARQ feedback information, whether the PUCCH resources are determined from the dedicated PUCCH resource set of the UE or the PUCCH resources are determined from the cell specific PUCCH resource set, avoiding the confusion phenomenon that the UE cannot determine which resource indication is used for determining the PUCCH resources during the RRC reconfiguration, and further improving the flexibility of determining the PUCCH resources.

Embodiments of the disclosure can provide methods, systems and computer program products. Thus the disclosure can take the form of hardware embodiments alone, software embodiments alone, or embodiments combining the software and hardware aspects. Also the disclosure can take the form of computer program products implemented on one or more computer usable storage mediums (including but not limited to magnetic disk memories, CD-ROMs, optical memories and the like) containing computer usable program codes therein.

The disclosure is described by reference to the flow charts and/or the block diagrams of the methods, the devices (systems) and the computer program products according to the embodiments of the disclosure. It should be understood that each process and/or block in the flow charts and/or the block diagrams, and a combination of processes and/or blocks in the flow charts and/or the block diagrams can be implemented by the computer program instructions. These computer program instructions can be provided to a general-purpose computer, a dedicated computer, an embedded processor, or a processor of another programmable data processing device to produce a machine, so that an apparatus for implementing the functions specified in one or more processes of the flow charts and/or one or more blocks of the block diagrams is produced by the instructions executed by the computer or the processor of another programmable data processing device.

These computer program instructions can also be stored in a computer readable memory which is for guiding the computer or another programmable data processing device to operate in a particular way, so that the instructions stored in the computer readable memory produce a manufacture including the instruction apparatus which implements the functions specified in one or more processes of the flow charts and/or one or more blocks of the block diagrams.

These computer program instructions can also be loaded onto the computer or another programmable data processing device, so that a series of operation steps are performed on the computer or another programmable device to produce the computer-implemented processing. Thus the instructions executed on the computer or another programmable device provide steps for implementing the functions specified in one or more processes of the flow charts and/or one or more blocks of the block diagrams.

Although the preferred embodiments of the invention have been described, those skilled in the art can make additional alterations and modifications to these embodiments once they learn about the basic creative concepts. Thus the attached claims are intended to be interpreted to include the preferred embodiments as well as all the alterations and modifications falling within the scope of the invention.

Evidently those skilled in the art can make various modifications and variations to the embodiments of the invention without departing from the spirit and scope of the embodiments of the invention. Thus the invention is also intended to encompass these modifications and variations therein as long as these modifications and variations to the embodiments of the invention come into the scope of the claims of the invention and their equivalents.

The invention claimed is:

1. A resource determining method, comprises:
   detecting a Physical Downlink Control Channel, PDCCH;
   determining Physical Uplink Control Channel, PUCCH, resources required by a User Equipment, UE, during Radio Resource Control, RRC, reconfiguration based on detected PDCCH;
   wherein the PDCCH is detected in a Control Resource Set, CORESET 0, indicated by a network side;
   wherein the determining PUCCH resources required by a UE during RRC reconfiguration based on detected PDCCH, comprises:
   determining the PUCCH resources from a cell specific PUCCH resource set in response to that detecting one PDCCH or two PDCCHs in the CORESET 0 and bits occupied by Hybrid Automatic Repeat Request, HARQ, feedback information is less than or equal to 2;
   determining the PUCCH resources from a dedicated PUCCH resource set of the UE in response to that detecting a PDCCH that does not belong to the CORESET 0; or
   determining the PUCCH resources from the dedicated PUCCH resource set of the UE in response to that detecting a plurality of PDCCHs and bits occupied by the HARQ feedback information is greater than 2.

2. The method according to claim 1, wherein the determining the PUCCH resources comprises:
   in response to that a format of the detected PDCCH is Downlink Control Information, DCI, 1_0 or DCI information carried in the detected PDCCH contains 4-bit information indicating a PUCCH resource index, determining the PUCCH resources a cell specific PUCCH resource set.

3. The method according to claim 1, wherein the cell specific PUCCH resource set is a cell specific PUCCH resource set configured by the UE during initial access.

4. A resource indication method, comprises:
   determining that a User Equipment, UE, is in a Radio Resource Control, RRC, reconfiguration state;
   sending a Physical Downlink Control Channel, PDCCH, to the UE to indicate Physical Uplink Control Channel, PUCCH, resources required by the UE during RRC reconfiguration
   wherein the PUCCH resources required by a UE during RRC reconfiguration are determined by:

determining the PUCCH resources from a cell specific PUCCH resource set in response to that detecting one PDCCH or two PDCCHs in the CORESET 0 and bits occupied by Hybrid Automatic Repeat Request, HARQ, feedback information is less than or equal to 2;

determining the PUCCH resources from a dedicated PUCCH resource set of the UE in response to that detecting a PDCCH that does not belong to the CORESET 0; or determining the PUCCH resources from the dedicated PUCCH resource set of the UE in response to that detecting a plurality of PDCCHs and bits occupied by the HARQ feedback information is greater than 2.

5. The method according to claim 4, wherein the sending a PDCCH to the UE, comprises:

sending the PDCCH in a Control Resource Set, CORESET, configured by a network side for the UE.

6. The method according to claim 5, wherein the sending a PDCCH to the UE to indicate PUCCH resources required by the UE during RRC reconfiguration, comprises:

notifying the UE of determining the PUCCH resources in a cell specific PUCCH resource set through an index of the CORESET, or a PDCCH format, or a DCI information indication field carried in the PDCCH.

7. A resource determining apparatus, comprises:

a memory configured to store program instructions;

a processor configured to invoke the program instructions stored in the memory to perform a process of:

detecting a Physical Downlink Control Channel, PDCCH;

determining Physical Uplink Control Channel, PUCCH, resources required by a User Equipment, UE, during Radio Resource Control, RRC, reconfiguration based on detected PDCCH;

wherein the processor is further configured to invoke the program instructions to detect the PDCCH in a Control Resource Set, CORESET 0, indicated by a network side;

wherein the processor is configured to invoke the program instructions to perform the process of determining the PUCCH resources by:

determining the PUCCH resources from a cell specific PUCCH resource set in response to that detecting one PDCCH or two PDCCHs in the CORESET 0 and bits occupied by Hybrid Automatic Repeat Request, HARQ, feedback information is less than or equal to 2;

determining the PUCCH resources from a dedicated PUCCH resource set of the UE in response to that detecting a PDCCH that does not belong to the CORESET 0; or determining the PUCCH resources from the dedicated PUCCH resource set of the UE in response to that detecting a plurality of PDCCHs and bits occupied by the HARQ feedback information is greater than 2.

8. The apparatus according to claim 7, wherein the processor is configured to invoke the program instructions to perform the process of determining the PUCCH resources by:

in response to that a format of the detected PDCCH is Downlink Control Information, DCI, 1_0 or DCI information carried in the detected PDCCH contains 4-bit information indicating a PUCCH resource index, determining the PUCCH resources from a cell specific PUCCH resource set.

9. The apparatus according to claim 7, wherein the cell specific PUCCH resource set is a cell specific PUCCH resource set configured by the UE during initial access.

10. A resource indication apparatus, comprises:

a memory configured to store program instructions;

a processor configured to invoke the program instructions stored in the memory to perform a process of:

determining that a User Equipment, UE, is in a Radio Resource Control, RRC, reconfiguration state;

sending a Physical Downlink Control Channel, PDCCH, to the UE via a transceiver to indicate Physical Uplink Control Channel, PUCCH, resources required by the UE during RRC reconfiguration;

wherein the PUCCH resources required by a UE during RRC reconfiguration are determined by:

determining the PUCCH resources from a cell specific PUCCH resource set in response to that detecting one PDCCH or two PDCCHs in the CORESET 0 and bits occupied by Hybrid Automatic Repeat Request, HARQ, feedback information is less than or equal to 2;

determining the PUCCH resources from a dedicated PUCCH resource set of the UE in response to that detecting a PDCCH that does not belong to the CORESET 0; or determining the PUCCH resources from the dedicated PUCCH resource set of the UE in response to that detecting a plurality of PDCCHs and bits occupied by the HARQ feedback information is greater than 2.

11. The apparatus according to claim 10, wherein the processor is configured to invoke the program instructions to send the PDCCH to the UE by:

sending the PDCCH in a Control Resource Set, CORESET, configured by a network side for the UE.

12. The apparatus according to claim 11, wherein the processor is configured to invoke the program instructions to send the PDCCH to the UE by:

notifying the UE of determining the PUCCH resources in a cell specific PUCCH resource set through an index of the CORESET, or a PDCCH format, or a DCI information indication field carried in the PDCCH.

13. A non-transitory computer storage medium, stores computer executable instructions which are configured to cause the computer to perform the method of claim 1.

14. A non-transitory computer storage medium, stores computer executable instructions which are configured to cause the computer to perform the method of claim 4.

* * * * *